C. P. MORTON.
CUTTER HEAD.
APPLICATION FILED NOV. 4, 1916.
1,226,686.
Patented May 22, 1917.
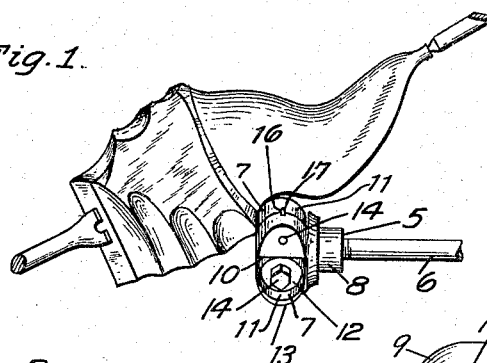
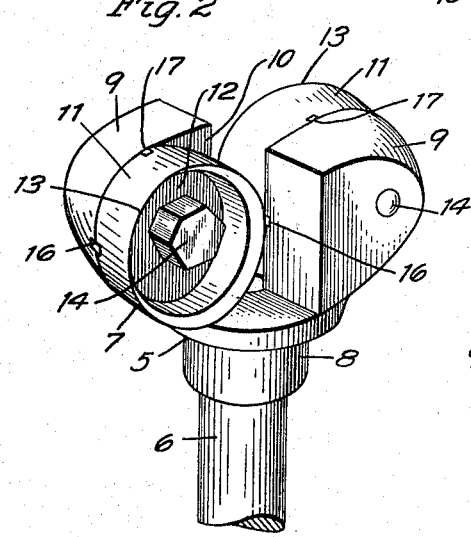
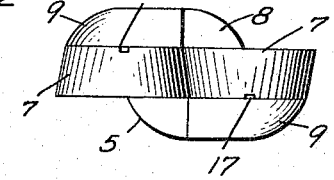
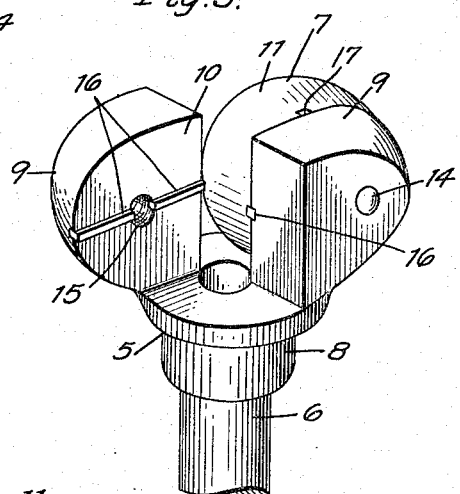
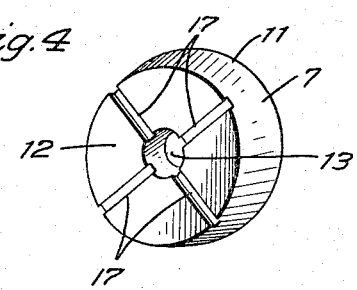
Witnesses.
F. E. Arthur,
W. Thornton Bogert
Inventor
Charles P. Morton
By Walter F. Murray
Attorney
THE NORRIS PETERS CO., PHOTO-LITHO., WASHINGTON, D. C.

UNITED STATES PATENT OFFICE.

CHARLES P. MORTON, OF CINCINNATI, OHIO.

CUTTER-HEAD.

1,226,686. Specification of Letters Patent. Patented May 22, 1917.

Application filed November 4, 1916. Serial No. 129,414.

*To all whom it may concern:*

Be it known that I, CHARLES P. MORTON, a citizen of the United States of America, and resident of Cincinnati, in the county of Hamilton and State of Ohio, have invented a new and useful Improvement in Cutter-Heads, of which the following is a specification.

This invention relates to cutter heads and particularly to cutter heads adapted to operate upon lasts and similar irregularly shaped articles.

Experience has demonstrated that the shapes of modern lasts require cutter heads having a maximum diameter of not over three inches, the hollow portions of these lasts necessitating the use of a cutter head which is of sufficiently small diameter to cut into and form the hollows of the lasts. The difficulty has been however, that in making cutter heads of this diameter, the curvature of the usual curved cutter blades has had to be reduced to such an extent that the cuts made by them are of so sharp a curvature that ridges were left in the surface of the finished last. In order to overcome this and other objections to the ordinary form of last lathe cutter heads I have devised the cutter head forming the subject matter of this invention in which;

An object is to produce a cutter head having a plurality of cutter blades, and in which there is had a maximum diameter of cutter blades and a minimum diameter of cutter head.

A further object is to produce a cutter head in which each cutter blade is provided with a maximum amount of cutting edge and which may be adjusted to bring fresh portions of the cutting edge into operative position, means being provided to positively lock the blades against movement from their adjusted positions.

These and other objects are attained in the cutter head described in the following specification and illustrated in the accompanying drawings, in which;

Figure 1 is a plan view of my improved cutter head in position and operating upon a last block.

Fig. 2 is a perspective view of my improved cutter head.

Fig. 3 is a perspective view of my improved cutter head with one of the cutter blades removed.

Fig. 4 is a perspective view of one of the cutter blades of my improved cutter head, the blade being turned to disclose its under side.

Fig. 5 is a plane view of my cutter head.

The cutter head embodying my invention consists of a body portion 5 adapted to be mounted upon a lathe spindle 6 in any suitable manner, as for example by means of the usual screw threads, and a pair of cutter blades 7 mounted on the body portion. The body portion preferably consists of a collar 8 having a pair of lugs 9 extending from the end face of the collar and located on opposite sides thereof, these lugs extending in opposite directions as disclosed in Figs. 2 and 3. The inner faces 10 of these lugs, are the ones against which the cutter blades are clamped and the cutter blades which are clamped there against are of cylindrical or cup-like formation, the blades being given somewhat of a cone frustum shape with the cutting edges formed on the ends of larger diameter. These blades consist of a rim 11 having a bottom 12 and circular cutting edge 13, the cutting edge being constructed to present the bevel thereof to the interior of the cup-like formation of the blade in order to present the edge of the blade to the work being operated upon. Centrally of the bottom 12 is formed an opening 13 through which a set screw 14 is passed, the set screw occupying a screw threaded aperture 15 in each of the lugs 9 for the purpose of clamping the cutter blades in position. In order to prevent gradual rotation of the cutter blades when secured in position by means of the set screws 14, I have provided means consisting of keys 16 located in slots formed in the inner faces of the lugs 9, the keys also occupying slots 17 formed in the under faces of the cutter blades. The slots 17 of the cutter blades are formed at angles to one another so that the blades may be moved to bring any of the slots into engagement with the keys. By this means the blades are positively prevented from changing their adjusted positions when the set screws 14 are moved to clamp them in position over the keys.

In the cutter head embodying my improved construction as above described, I have been enabled to provide cutter blades of greatest possible diameter, and in which the least possible diameter of cutter head has been provided. In fact, in my improved construction I have been enabled to produce a construction in which the cutter blades are exactly one half of the diameter of the entire cutter head. This, as previously set forth, is one of the principal features of novelty of my improved cutter head construction. The reason for my being enabled to provide cutter blades of such large diameter in relation to the greatest diameter of the entire head is because of the cone frustum shape of the cutter blades and their positioning into overlapping and abutting relation with one another as disclosed in Fig. 5.

In addition to this in my improved construction the blades may be used until the portions of their edges which have been working upon the material to be cut, have become dull. Then the set screws 14 may be loosened sufficiently to allow the cutter blades to be lifted from the keys 16. The blades are then given a quarter of a revolution upon the set screws 14 and brought into engagement with the keys 16. The set screws are then moved to clamp the cutter blades in their newly adjusted positions, and the cutter head is once more in condition to be used, the blades having been rotated to present fresh cutting edges to the work being done. This adjustment of the blades may be repeated four distinct times without having to remove the blades and sharpen them. Thus it will be seen, that I have devised a cutter head construction in which the blades are provided with a multiplicity of cutting edges which are so shaped as to permit movement of the blades from one cutting edge to the other without changing the position of each cutting edge with relation to the work being operated upon, and that by means of this construction, the blades may be sharpened and resharpened repeatedly and replaced without requiring any time or skill to properly adjust them to the desired positions for operating upon the work. In addition to this the cutter head embodying my invention has the further advantage that it permits of the blades being adjusted and then positively locked in their adjusted positions so that there is absolutely no tendency for them to creep from these positions during their operation. The result attained by such a construction is that the blades will operate upon the surface of the work in the same manner whether they be readjusted or resharpened once or many times during their operation upon the same piece of work.

Having thus described my invention, what I claim is;

A rotary cutter comprising a body portion having lugs projecting from its end, said lugs having opposed mounting faces spaced apart a distance equal to the thickness of the cutters, cup-shaped cutters with annular cutting edges the diameter of which is substantially equal to the length of the radius of the cutter head, and means for mounting the cutters upon the mounting faces in alinement with each other and with their inner walls in contact with each other.

In testimony whereof, I have hereunto subscribed my name this 24th day of October, 1916.

CHARLES P. MORTON.

Witnesses:
WALTER F. MURRAY,
W. THORNTON BOGERT.

Copies of this patent may be obtained for five cents each, by addressing the "Commissioner of Patents, Washington, D. C."